United States Patent
Birincioglu et al.

(10) Patent No.: US 7,556,440 B2
(45) Date of Patent: Jul. 7, 2009

(54) DUAL-LENSED UNITARY OPTICAL RECEIVER ASSEMBLY

(75) Inventors: Dincer Birincioglu, Foster City, CA (US); Rajesh Dighde, Sammamish, WA (US); Mary Nadeau, Alburtis, PA (US); David Piede, Allentown, PA (US); Wenhong Qin, Hangzhou (CN)

(73) Assignee: Lightwire Inc., Allentown, PA (US)

( * ) Notice: Subject to any disclaimer, the term of this patent is extended or adjusted under 35 U.S.C. 154(b) by 0 days.

(21) Appl. No.: 12/004,241

(22) Filed: Dec. 20, 2007

(65) Prior Publication Data

US 2008/0166136 A1    Jul. 10, 2008

Related U.S. Application Data

(60) Provisional application No. 60/876,848, filed on Dec. 22, 2006, provisional application No. 60/899,208, filed on Feb. 3, 2007.

(51) Int. Cl.
*G02B 6/32* (2006.01)
*G02B 6/34* (2006.01)
*G02B 6/42* (2006.01)
*G02B 6/43* (2006.01)

(52) U.S. Cl. ............ 385/93; 385/33; 385/36; 385/89

(58) Field of Classification Search .......... None
See application file for complete search history.

(56) References Cited

U.S. PATENT DOCUMENTS

| | | | |
|---|---|---|---|
| 6,715,934 B2 | 4/2004 | Suzuki et al. | |
| 6,853,767 B1 | 2/2005 | Farr et al. | |
| 6,888,988 B2 * | 5/2005 | Vancoille et al. | 385/47 |
| 6,910,812 B2 | 6/2005 | Pommer et al. | |
| 6,931,181 B2 | 8/2005 | Jewell et al. | |
| 6,939,058 B2 | 9/2005 | Gurevich et al. | |
| 7,013,056 B2 | 3/2006 | Lin et al. | |
| 7,031,576 B2 | 4/2006 | Deane | |
| 7,106,980 B2 | 9/2006 | Nakanishi et al. | |
| 7,264,408 B2 | 9/2007 | Togami et al. | |
| 7,306,378 B2 | 12/2007 | Alduino et al. | |
| 2002/0081073 A1 | 6/2002 | Lee et al. | |
| 2003/0020998 A1 | 1/2003 | Kuczynski | |
| 2003/0152343 A1 | 8/2003 | Yamada et al. | |
| 2003/0161603 A1 | 8/2003 | Nadeau et al. | |
| 2004/0155565 A1 | 8/2004 | Holder et al. | |

(Continued)

FOREIGN PATENT DOCUMENTS

EP    0 324 288    7/1989

*Primary Examiner*—Omar Rojas
(74) *Attorney, Agent, or Firm*—Wendy W. Koba

(57) ABSTRACT

A unitary optical receiver assembly is formed to include a V-groove passively aligned with a first aspheric lens (the lens formed along a surface perpendicular to the V-groove). An optical fiber is disposed along the V-groove and is used to bring the received optical signal into the unitary assembly. Upon passing through the first aspheric lens, the received optical signal will intercept a 45° turning mirror wall that directs the signal downward, through a second aspheric lens (also molded in the unitary assembly), and then into a photosensitive device. Advantageously, the photosensitive device is disposed in passive alignment with the second aspheric lens, allowing for a received signal to be coupled from an incoming optical fiber to a photosensitive device without needing any type of active alignment therebetween.

10 Claims, 4 Drawing Sheets

U.S. PATENT DOCUMENTS

2004/0264856 A1 12/2004 Farr
2005/0018715 A1 1/2005 Varshneya et al.
2005/0018981 A1 1/2005 Modavis et al.
2005/0047724 A1 3/2005 Farr
2006/0051033 A1 3/2006 Tabata et al.
2006/0098292 A1 5/2006 Wong et al.
2007/0140625 A1 6/2007 Chen et al.

* cited by examiner

DUAL-LENSED UNITARY OPTICAL RECEIVER ASSEMBLY

CROSS-REFERENCE TO RELATED APPLICATIONS

This application claims the benefit of U.S. Provisional Application No. 60/876,848, filed Dec. 22, 2006 and U.S. Provisional Application No. 60/899,208 filed Feb. 3, 2007.

TECHNICAL FIELD

The present invention relates to a dual-lensed unitary optical receiver assembly and, more particularly, to a unitary assembly for providing passive alignment between an incoming optical fiber (or other waveguiding structure) and a photosensitive receiving device.

BACKGROUND OF THE INVENTION

Optical networking, including fiber-optics and optoelectronics, is an important aspect of high speed communication systems, particularly for its ability to allow for efficient, accurate, and rapid transmission of data between various components in the network system. As with most communication systems, the efficient use of space and power in optical networks is of ever-increasing importance. Further, design considerations for such networks must take into account the modularity of the particular components that are included in the network.

Indeed, modular components are desirable in fiber optic systems to reduce the cost of manufacturing the system, which increases the more customized the system becomes. An example of a modular component is an optical receiver module, which may also be a portion of a complete optical transceiver assembly (including both an optical transmitter module and an optical receiver module), or an optical transponder further comprising wavelength multiplexing/demultiplexing. A typical optical receiver module includes an input port/channel for an optical fiber (or other light propagating arrangement), a photodiode for detecting the incoming optical signals, and a sensing circuit for converting the optical signals to digital electrical signals compatible with other network components.

The number and placement of these elements of an optical receiver has heretofore limited the ability to reduce the size of the receiver, as well as its cost and complexity. For example, optical alignment between an incoming optical signal (usually along an optical fiber) and a photosensitive device has typically required "active" alignment, with the placement of the photosensitive device being maneuvered until a maximum optical power is detected. In high speed optical receivers, the photosensitive device generally exhibits a relatively small active area (in order to more efficiently convert the optical signal into its electrical counterpart). This small active area makes the process of performing an active alignment even more difficult.

Thus, a need remains in the art for an optical receiver module that is truly compact and allows for the use of passive alignment between the incoming optical signal and the photosensitive receiving device.

SUMMARY OF THE INVENTION

The need remaining in the prior art is addressed by the present invention which relates to a dual-lensed unitary optical receiver assembly and, more particularly, to a transparent unitary assembly for providing passive alignment between an incoming optical fiber (or other waveguiding structure) and a photosensitive receiving device.

In accordance with the present invention, a unitary receiver assembly is formed to include a V-groove aligned with a collimating lens (the lens formed along a surface perpendicular to the V-groove). An optical fiber is disposed along the V-groove and is used to bring the received optical signal into the unitary assembly. Upon passing through the collimating lens, the received optical signal will intercept a turning mirror wall that directs the signal downward, through a focusing lens (also molded in the unitary assembly), and then into a photosensitive device. Advantageously, the photosensitive device is disposed in passive alignment with the focusing lens, allowing for a received signal to be coupled from an incoming optical fiber to a photosensitive device without needing any type of active alignment therebetween. The utilization of a focusing lens allows for a received signal to be efficiently coupled into the photosensitive device. Therefore, a small active area photodiode (as used in high speed applications) is suitable for use in the unitary module of the present invention. Moreover, by directly molding the collimating and focusing lenses (and V-groove) into the unitary receiver module, passive alignment between the fiber and photosensitive device is achieved, reducing the cost and complexity of the receiver arrangement.

In another aspect of the present invention, the unitary assembly may be formed to include an incoming optical waveguide (in place of an incoming optical fiber), where the core of the waveguide is again formed to be in alignment with the collimating lens.

It is a feature of the present invention that the use of molded lenses within the unitary assembly, in combination with the V-groove and turning mirror, allows for an array structure to be easily formed, accommodating a plurality of these features, disposed along the surface of a single assembly. Such an array of molded lenses may alternatively be used in association with an inserted prism element and single input fiber carrying multiple wavelength signals to form a demultiplexing device.

In prior art optical receiver/transceiver assemblies, the optical port axis is typically parallel to the supporting substrate surface. The assembly generally comprises two components: a TO can optical port assembly (containing a photodiode and a transimpedance amplifier), and a flex circuit for connecting the TO can to the substrate. The arrangement of the present invention eliminates the need for the two separate elements and particularly eliminates the need for the flex circuit inasmuch as the photodiode is directly located on the substrate as part of the unitary assembly.

Other and further aspects and features of the present invention will become apparent during the course of the following discussion and by reference to the accompanying drawings.

BRIEF DESCRIPTION OF THE DRAWINGS

Referring now to the drawings, where like reference numerals represent like parts in several views.

DETAILED DESCRIPTION

Figure 1:
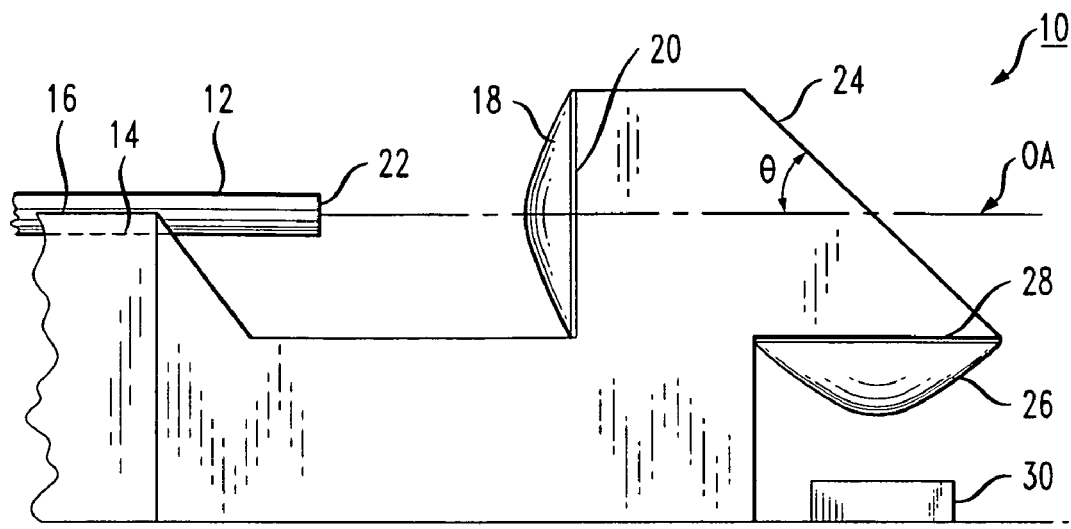
FIG. 1 is a side view of an exemplary unitary receiver module formed in accordance with the present invention, particularly illustrating the location and placement of the collimating and focusing lenses and the turning mirror.

FIG. 1 illustrates an exemplary unitary optical receiver module 10 formed in accordance with the present invention. Module 10 is formed of a transparent material, such as a polyimide thermoplastic resin or any other material which allows for an optical signal to propagate therethrough with little or no loss of signal. An optical fiber 12, carrying the received optical signal, is disposed within a V-groove 14 formed in surface 16 of module 10.

A collimating lens 18 is molded along a vertical wall 20 so as to align with the core region of optical fiber 12. Collimating lens 18 functions to capture the optical signal exiting endface 22 of fiber 12 and form a collimated wavefront which thereafter propagates through the transparent material of module 10. As shown in FIG. 1, the propagating signal will intercept angled wall 24 of module 10, where wall 24 is beveled at a predetermined angle θ with respect to the optical axis (OA). In a preferred embodiment, the angle θ may be 45°, but other values may be used (with the properties of various other elements modified accordingly). The reflected signal will remain collimated, in this case now directed downward and into a focusing lens 26 molded along a horizontal wall 28 of module 10. A photosensitive device 30 (such as a PIN photodiode) is disposed underneath focusing lens 26 such that the optical signal entering lens 26 will be focused directly into the photosensitive region of device 30. As mentioned above, by using lens 26 to focus the light into device 30, a high speed, small active area photodiode may be used.

Figure 2:
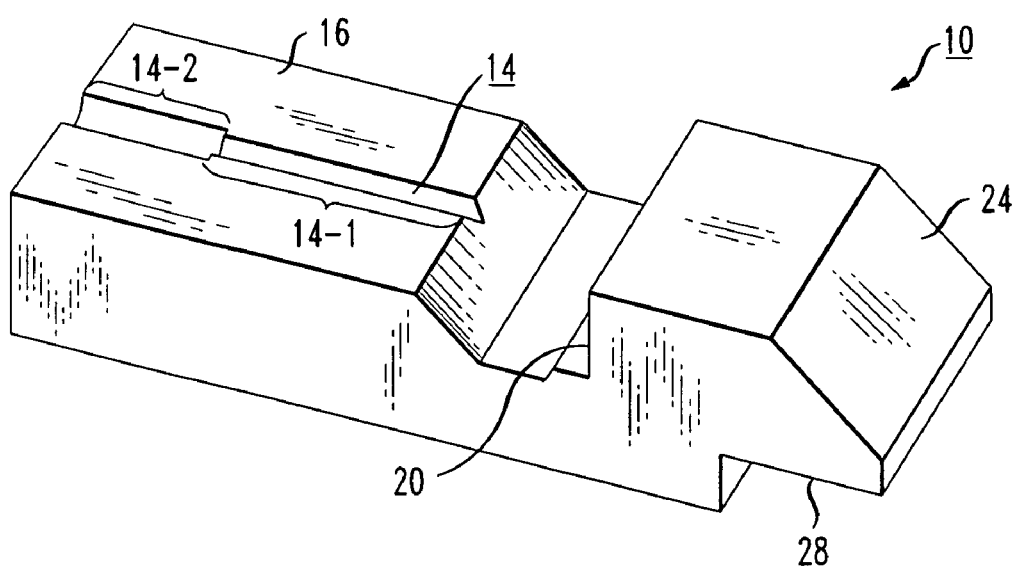
FIG. 2 is an isometric view of the module of FIG. 1, particularly illustrating the location of the fiber-supporting V-groove.

The isometric view of module 10 in FIG. 2 clearly illustrates the location and formation of V-groove 14 (while lenses 18 and 26 cannot be seen in this view). In this particular embodiment, V-groove 14 is shown as including an inner, shallower V-groove 14-1 for supporting an end section of bare fiber (i.e., fiber with the outer cladding removed) and an outer, deeper V-groove 14-2. Outer section 14-2 is used to support the incoming optical fiber which is still clad with an outer sheathing layer. Obviously, the details of the fiber-supporting V-groove are a matter of design choice (e.g., groove, trench, channel or the like, variously referred to hereinafter as "groove"), as long as the core region of the fiber will align with optical axis OA and the center of the first aspheric lens 18.

Figure 3:
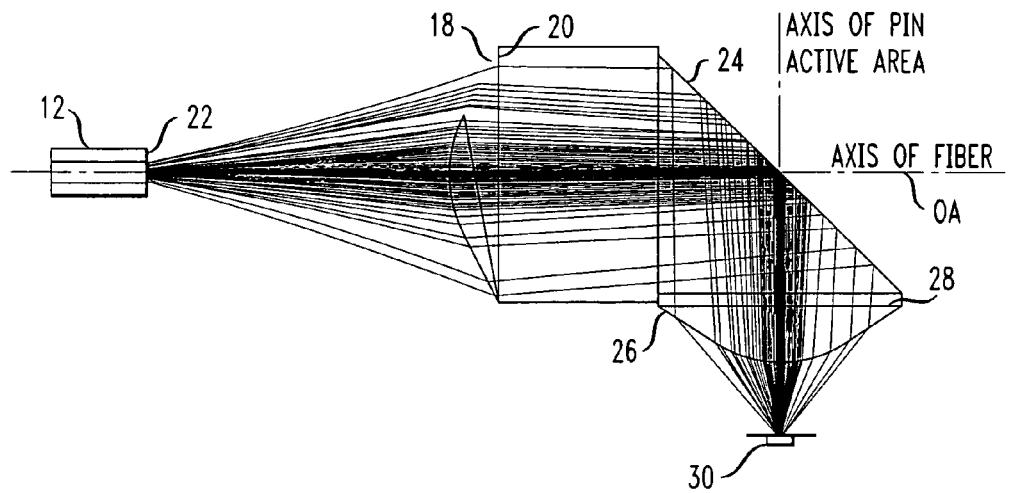
FIG. 3 is a ray tracing diagram, illustrating the alignment between the fiber endface, the collimating lens, the turning mirror, the focusing lens, and the photodiode.

FIG. 3 is a ray tracing illustrating the various factors of concern to be considered when determining the dimensions of the molded, unitary receiver module of the present invention. These factors are shown as including: (1) the axis of the fiber; (2) the separation between the fiber endface and the collimating lens; (3) the axis of the photosensitive device; (4) the location of the turning wall at the intersection of the two axes (fiber and photosensitive device); and (5) the separation between the photosensitive device and the focusing lens. Of course, the curvature of the lenses will be factors involved in determining the separation between the lenses and their associated optical devices. It is an advantage of the present invention that the use of a molded structure to form module 10 allows for the curvature of each lens to be specifically tailored for its intended use, allowing for changes in curvature as the type of fiber and/or photodetector are changed.

Figure 4:
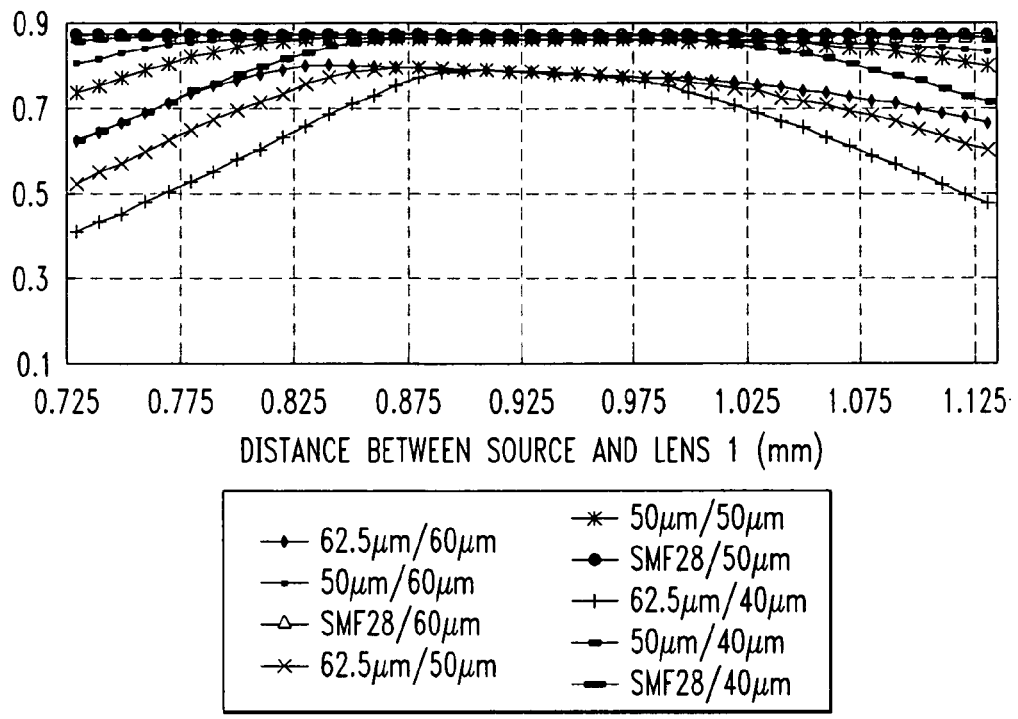
FIG. 4 is a graph of coupling efficiency between an incoming fiber and the collimating lens as a function of the separation between the two components.
Figure 5:
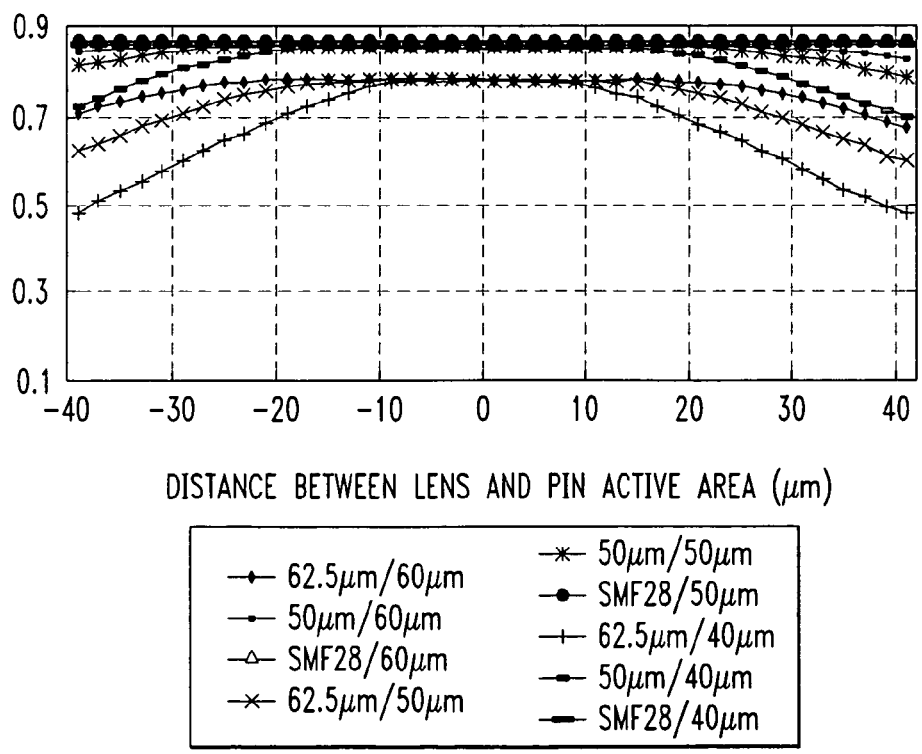
FIG. 5 is a graph of coupling efficiency between a focusing lens and a photodiode as a function of the separation between the two components.

Indeed, it is a specific advantage of the arrangement of the present invention that the ability to directly mold the lenses (and fiber/waveguide) into the receiver structure allows for a passively aligned receiver to be formed, eliminating the need for active alignment processes between the fiber, lenses and receiving device. The overall receiver is therefore less expensive and more efficient to manufacture than prior art receivers requiring active alignment. It has been found that today's precision molding capabilities allow for the lenses and V-groove (waveguide) to be formed and automatically aligned well within the acceptable tolerances associated with conventional optical receivers. FIG. 4 is a graph exemplary of this advantage, illustrating the acceptable tolerance range associated with the separation between the fiber endface and the collimating lens. As shown, a tolerance on the order of ±100 μm still yields an acceptable coupling efficiency (depicted as a reduction from 100% coupling efficiency) for a variety of different types of input fibers, including both multimode fiber and single mode fiber. FIG. 5 is another graph exemplifying this feature, in this case illustrating the tolerance associated with the separation between the focusing lens and the active area of the photosensitive device. As shown, a separation tolerance on the order of ±30 μm between the active area and the focusing lens still provides a sufficient coupling efficiency (again represented as a reduction from 100% coupling efficiency).

Figure 6:
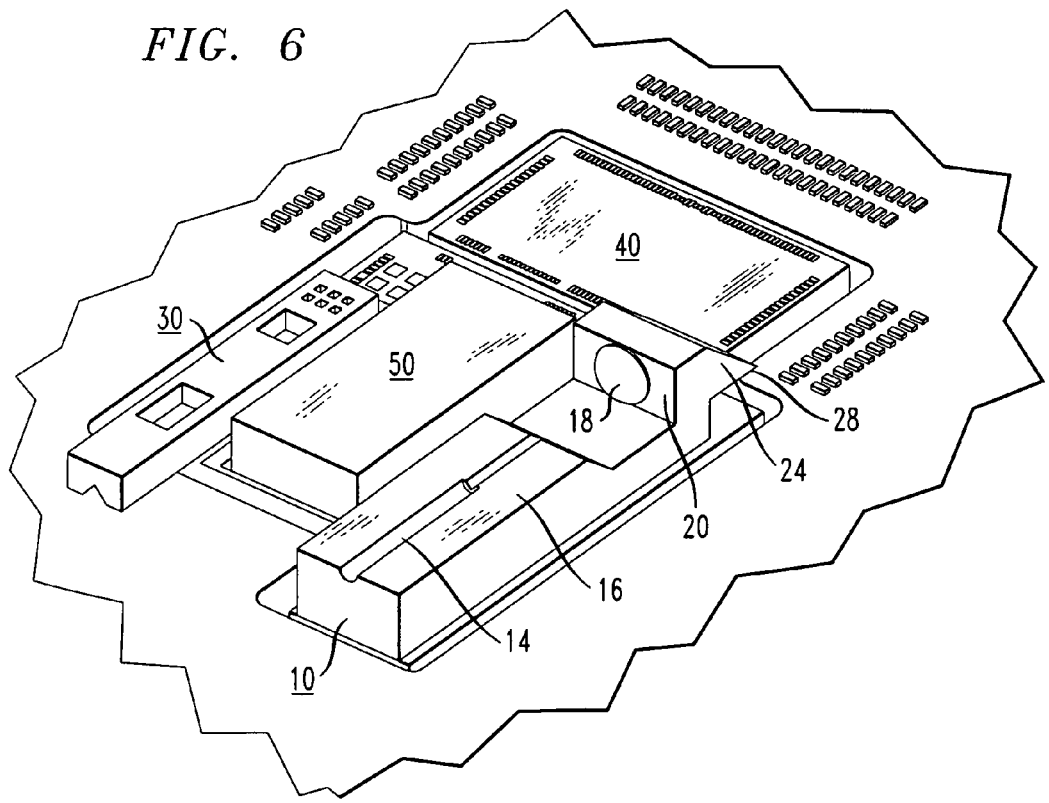
FIG. 6 is an isometric view of an exemplary optical transceiver system incorporating the unitary optical receiver module of the present invention.

As mentioned above, a significant advantage of the unitary optical receiver module of the present invention is that it may be easily incorporated within a larger optical transceiver arrangement. FIG. 6 illustrates one such optical transceiver, with optical receiver module 10 used in association with an optical transmitter 30 and associated optical and electrical components 40 and 50, respectively.

Figure 7:
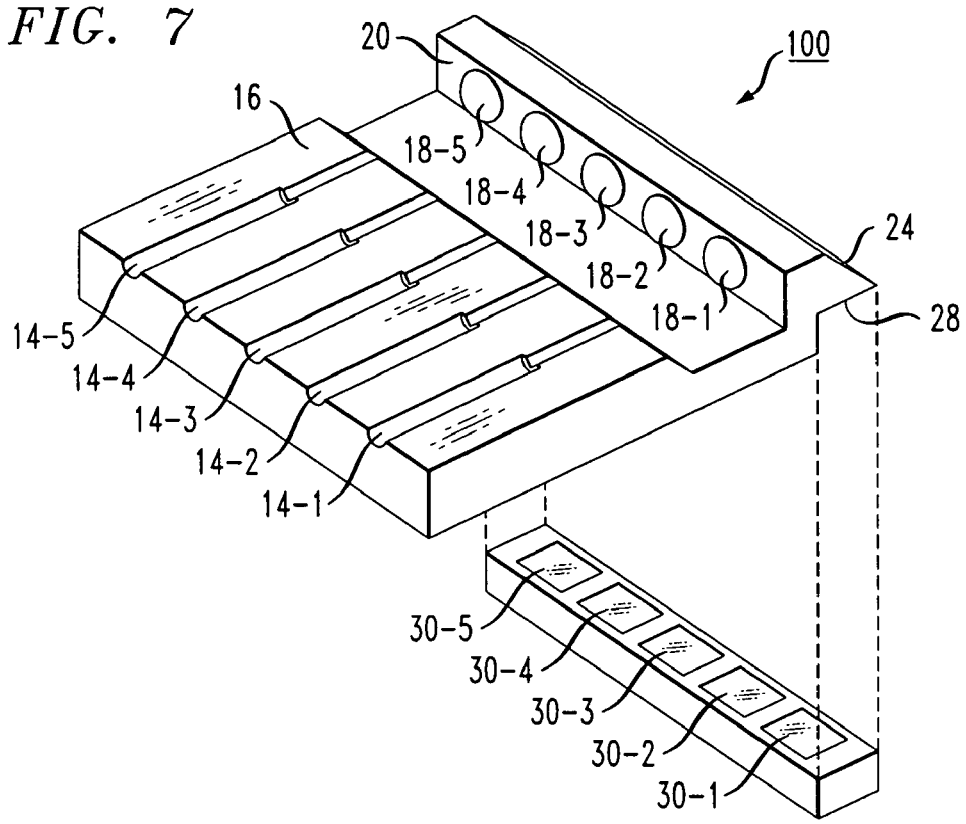
FIG. 7 contains an isometric view of an exemplary array configuration of the unitary optical receiver module of the present invention.

Indeed, the utilization of a transparent, moldable material to form the optical receiver module of the present invention has been found to allow for an array structure to be formed, again eliminating the need to provide active alignment between the various components. FIG. 7 illustrates an exemplary unitary optical receiver array module 100, in this case used to support a set of five separate input signals. Each V-groove 14-1, 14-2, . . . , 14-5 is formed in a manner as discussed above to as to be in alignment with its counterpart collimating lens 18-1, 18-2, . . . , 18-5, respectively. A single beveled surface 24 provides the redirection for each of the signals into its own focusing lens (not shown in this view).

Figure 8:
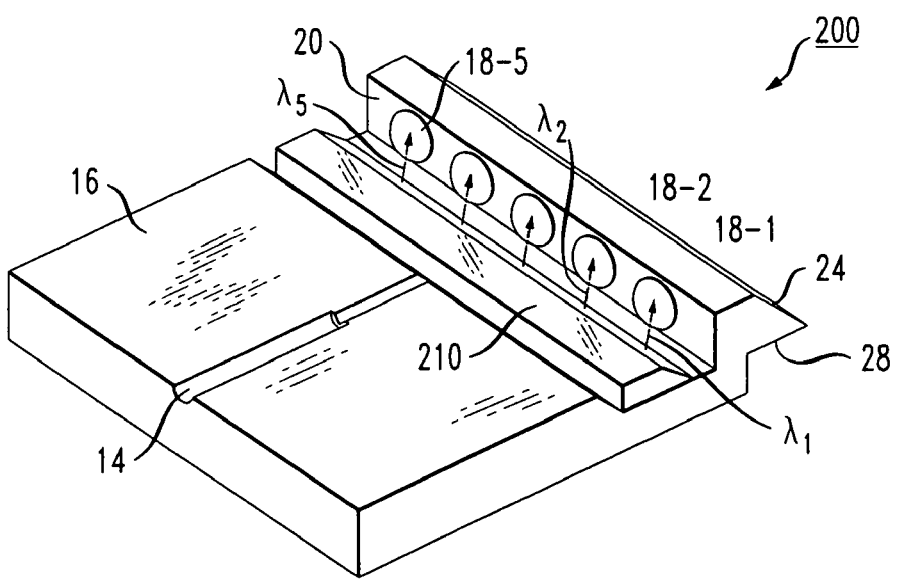
FIG. 8 illustrates an exemplary wavelength demultiplexer formed in accordance with the present invention.

Instead of utilizing a plurality of separate input fibers, a unitary receiver array module of the present invention may utilize a single input fiber, carrying signals at multiple wavelengths and a prism to direct each different wavelength signal into a different collimating lens. FIG. 8 illustrates this embodiment in the form of a wavelength demultiplexing optical receiver module 200. Module 200 is shown as including a single V-groove 14 for supporting an incoming fiber (not shown), the fiber carrying a plurality of different signals operating at different wavelengths. A prism element 210 is disposed along trough 220 between V-groove 14 and vertical wall 20 supporting a plurality of separate collimating lenses

18-1, 18-2, . . . , 18-5. In this particular embodiment, prism 210 is configured to split apart the various received wavelengths, directing each wavelength toward a separate one of lenses 18. This is illustrated in FIG. 8 by a first wavelength signal $\lambda_1$ directed towards lens 18-1, a second signal at $\lambda_2$ directed toward lens 18-2, and so on.

While the principles of the invention have been described above in connection with the preferred embodiments, it is to be understood that this description is made only by way of example and not as a limitation on the scope of the invention.

What is claimed is:

1. A unitary optical receiver assembly comprising:
    a first horizontal surface defining an incoming optical signal axis and including a groove for supporting an optical fiber;
    a collimating lens disposed to intercept an incoming optical signal, said collimating lens molded to a vertical wall portion of the unitary optical receiver assembly so as to be in alignment with the optical fiber supported in the first horizontal surface groove;
    a beveled wall surface disposed beyond the collimating lens, said beveled wall for re-directing an incoming optical signal downward in a direction away from the incoming optical signal axis;
    a focusing lens disposed to intercept the re-directed optical signal and re-focus the optical signal; and
    a photosensitive device disposed at the focal point of the focusing lens.

2. The unitary optical receiver assembly of claim 1 wherein the receive assembly comprises a transparent material.

3. The unitary optical receiver assembly as defined in claim 2 wherein the transparent material comprises a polyimide thermoplastic resin.

4. The unitary optical receiver assembly of claim 2 wherein the receiver assembly comprises a moldable, transparent material such that the collimating and focusing lenses are molded as integral elements within the assembly.

5. The unitary optical receiver assembly of claim 1 wherein the groove formed in the first horizontal surface comprises a V-groove.

6. The unitary optical receiver assembly of claim 5 wherein the V-groove includes an inner, shallower portion for supporting a bare, end section of optical fiber and an outer, deeper portion for supporting a cladded section of optical fiber.

7. The unitary optical receiver assembly of claim 1 wherein the beveled wall is oriented at an angle of approximately 45° to re-direct the collimated optical signal downward towards the photosensitive device.

8. A unitary optical receiver assembly for use with a plurality of separate photosensitive devices, the assembly comprising:
    a plurality of N collimating lenses, each lens disposed to intercept a separate incoming optical signal, said plurality of N collimating lens molded into a single vertical wall portion of the unitary optical receiver assembly;
    a beveled wall surface disposed beyond the plurality of N collimating lenses, said beveled wall for re-directing the separate incoming optical signals downward in a direction away from the incoming optical signal axis;
    a plurality of N focusing lenses disposed to intercept a separate one of the plurality of N re-directed optical signals and re-focus the intercepted optical signal;
    a plurality of N photosensitive devices, each photosensitive device disposed at the focal point of a separate one of the plurality of N focusing lenses; and
    a plurality of N grooves disposed along a horizontal surface of said assembly, each groove formed to be passively aligned with a separate one of the plurality of N collimating lenses.

9. A unitary optical receiver assembly as defined in claim 8 wherein the plurality of N grooves are formed to comprise a plurality of N V-grooves.

10. A unitary optical receiver assembly for use with a plurality of separate photosensitive devices, the assembly comprising:
    a plurality of N collimating lenses, each lens disposed to intercept a separate incoming optical signal, said plurality of N collimating lens molded into a single vertical wall portion of the unitary optical receiver assembly;
    a beveled wall surface disposed beyond the plurality of N collimating lenses, said beveled wall for re-directing the separate incoming optical signals downward in a direction away from the incoming optical signal axis;
    a plurality of N focusing lenses disposed to intercept a separate one of the plurality of N re-directed optical signals and re-focus the intercepted optical signal;
    a plurality of N photosensitive devices, each photosensitive device disposed at the focal point of a separate one of the plurality of N focusing lenses;
    a single groove disposed along a horizontal surface of said assembly, said single groove for supporting an optical fiber propagating a plurality of different signals operating at different wavelengths; and
    an optical prism disposed between the groove and the plurality of N collimating lenses, said optical prism for directing signals operating at different wavelengths toward different ones of the plurality of N collimating lenses.

* * * * *